United States Patent [19]

Tabisz et al.

[11] Patent Number: 4,841,220
[45] Date of Patent: Jun. 20, 1989

[54] DC-TO-DC CONVERTERS USING MULTI-RESONANT SWITCHES

[76] Inventors: Wojciech A. Tabisz, 6700 H. Terrace View, 24060; Fred C. Lee, 2909 Stradford Ln., both of Blacksburg, Va. 24060

[21] Appl. No.: 99,965

[22] Filed: Sep. 23, 1987

[51] Int. Cl.⁴ ........................ G05F 1/56; H02M 3/335
[52] U.S. Cl. ..................................... 323/282; 363/16; 323/235
[58] Field of Search ............... 323/235, 271, 272, 282, 323/283, 284, 285, 286, 287, 290; 363/16, 39, 45–47, 124

[56] References Cited
U.S. PATENT DOCUMENTS

| | | | |
|---|---|---|---|
| 4,720,667 | 1/1988 | Lee et al. | 323/271 |
| 4,720,668 | 1/1988 | Lee et al. | 323/271 |
| 4,734,636 | 3/1988 | Stevens | 323/287 |

Primary Examiner—Peter S. Wong
Attorney, Agent, or Firm—Mason, Fenwick & Lawrence

[57] ABSTRACT

A generalized multi-resonant switch that combines current-mode and voltage-mode resonant switches. Application of the multi-resonant switch in zero-voltage switched multi-resonant converters results in reduction of the voltage stress to the switching transistor, increase of the load range and reduction of the switching frequency bandwidth. Each embodiment of the multi-resonant converter includes a multi-resonant switch having an active switch, a passive switch and reactive components for causing the active and passive switches to operate in a multi-resonant manner.

11 Claims, 8 Drawing Sheets

FIG. 10A  BUCK
FIG. 10B  BOOST
FIG. 10C  BUCK-BOOST
FIG. 10D  CUK
FIG. 10E  ZETA
FIG. 10F  SEPIC
FIG. 11A  BUCK
FIG. 11B  BOOST
FIG. 11C  BUCK-BOOST
FIG. 11D  CUK
FIG. 11E  ZETA
FIG. 11F  SEPIC

DC-TO-DC CONVERTERS USING MULTI-RESONANT SWITCHES

FIELD OF THE INVENTION

The present invention relates to DC/DC converters, in general, and to a DC/DC converter employing a multi-resonant switch, in particular. The new converters overcome the problems of quasi-resonant circuits and allow operation at high frequency with performance enhanced characteristics.

BACKGROUND OF THE INVENTION

For many years, power processing and conditioning circuitry and systems used a linear technique to regulate output voltage. Under this technique, the output voltage of a power supply is regulated by deliberate dissipation of some of the energy entering the power supply. The energy is dissipated in a semiconductor device, typically a bipolar junction transistor operating in the linear (active) region. Prior art linear power supplies achieve low operating efficiencies of about 50%. Low operating efficiency is manifested by excessive heating of the semiconductor device. To maintain the temperature of the semiconductor device within prescribed specifications, a large and heavy heat sink is required.

Linear power supplies employ conventional 50/60 Hz power transformers followed by rectifier, filter and linear regulator. Because of the low frequency of processing, the transformer, as well as filter components, are large and heavy.

Miniaturization of the electronic equipment requires reduction of the size and weight of the power supplies used in that equipment. This is achieved by using switch-mode power supplies with semiconductor devices operating as electronic switches. By principle of operation, there is no deliberate power dissipation in the switching devices. Thus, the switch-mode power supplies are capable of high efficiency. For example, in practical circuits efficiency of 80% is achieved. In switch-mode power supplies the power processing is performed at much higher frequency than in linear power supplies, for example, at 20 to 100 KHz. This results in substantial reduction of the size of the transformer and filter components.

Figures 1A, 1B:
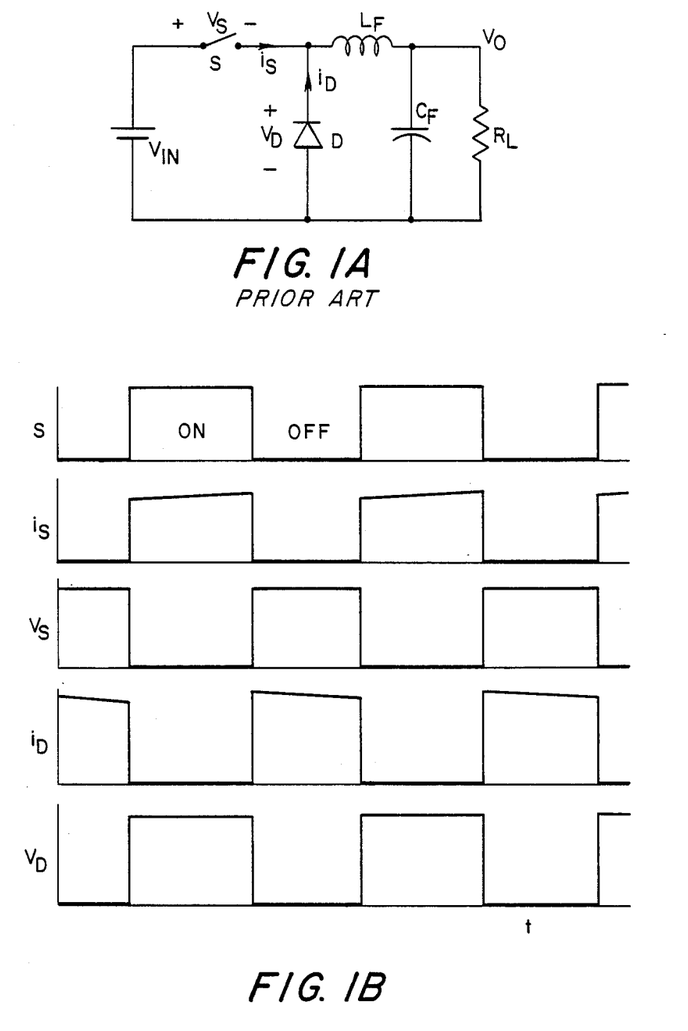
FIG. 1A a schematic circuit diagram of a prior art PWM buck converter.
FIG. 1B shows the operating waveform of the PWM buck converter of FIG. 1A.

One of the simplest switch-mode DC/DC power converters is the pulse width modulated (PWM) buck converter, shown in FIG. 1A with its operating waveforms shown in FIG. 1B. In FIG. 1B, the first graph shows the on/off states of switch S, the second graph shows the current through switch S, the third graph shows the voltage across switch S, the fourth graph shows the current through the diode D and the fifth shows the voltage across diode D. Switch S is typically implemented using a power metal oxide semiconductor field effect transistor (MOSFET) or bipolar junction transistor (BJT). Inductor $L_F$ and capacitor $C_F$ form an output filter. Resistor $R_L$ represents a load to which power is delivered.

Switch S is periodically closed and open. When S is closed, the input voltage $V_{IN}$ is applied to the diode D. The diode is reverse biased and does not conduct current. During this time (ON-time), energy is delivered to the circuit from $V_{IN}$ and stored in the filter components $L_F$ and $C_F$. When switch S is open, the inductor current is diverted from the switch to the diode, and the diode is turned on. During this time (OFF-time), the filter components release the energy stored during the ON-time into the load. The regulation of the output voltage $V_O$ is achieved by varying the ratio of the ON-time to the OFF-time.

Reduction of the size and weight of the switching power supply can be achieved by increasing the switching frequency. However, as the switching frequency increases, so do the switching losses in the switching device. Typically, switching losses increase proportionally to the frequency.

Switching losses can be divided into two categories: turn-off and turn-on losses. The turn-off losses are caused by simultaneous non-zero-voltage and non-zero-current applied to the switching device during turn-off. These losses can be reduced by reducing the turn-off time, which can be achieved by using fast switching transistors and appropriate drive circuits.

Turn-on losses, on the other hand, are caused by dissipation of the energy stored in the parasitic capacitance which exists in parallel with the switching device. This energy is completely dissipated in the switching transistor during turn-on. The turn-on power loss depends only on the energy stored in the parasitic capacitance and switching frequency and is not affected by the switching speed of the device.

Reduction of switching losses also can be achieved by applying certain of the concepts of resonant switching. One concept of resonant switching involves the use of quasi-resonant switches.

Figure 2A:
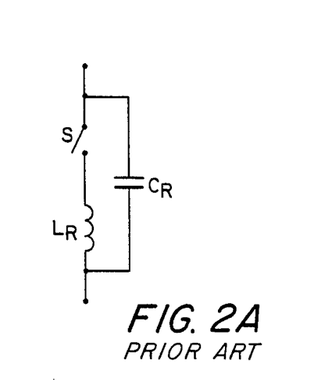
FIG. 2A is a schematic circuit diagram of a prior art basic zero-current mode quasi-resonant switch.
Figure 2B:
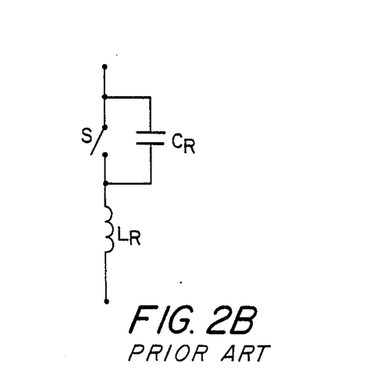
FIG. 2B is a schematic circuit diagram of a prior art basic zero-voltage mode quasi-resonant switch.

Two types of quasi-resonant switches have been introduced: a zero-current quasi-resonant switch as shown in FIG. 2A, and a zero-voltage quasi-resonant switch as shown in FIG. 2B. The two types of quasi-resonant switches are considered in co-pending U.S. patent applications Ser. Nos. 856,775; 877,184 and 877,185, now U.S. Pat. Nos. 4,785,387, 4,720,667 and 4,720,668 respectively, incorporated by reference herein. In the zero-current quasi-resonant switch, the resonant components, $L_R$ and $C_R$, shape the current through the switch S so that the current becomes zero prior to turn-off of the switch S. This reduces the turn-off losses. In the zero-voltage quasi-resonant switch, the resonant components shape the voltage across the switch S so that the voltage becomes zero prior to turn-on of the switch S.

Figure 3A:
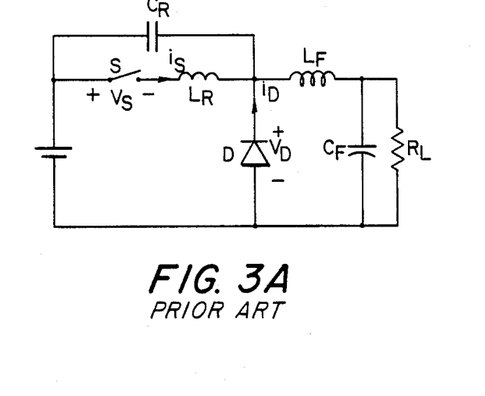
FIG. 3A is a schematic circuit diagram of a prior art zero-current switched quasi-resonant buck converter.
Figure 3B:
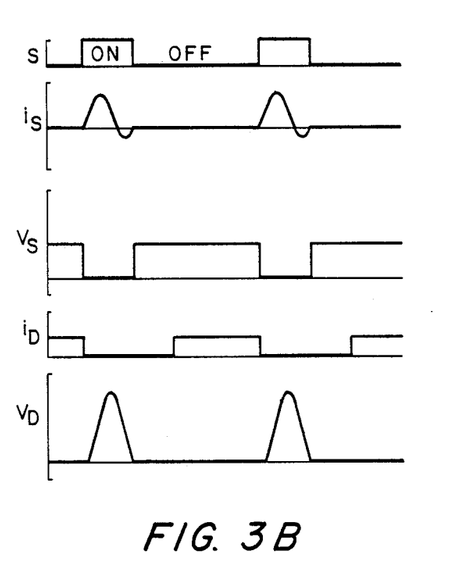
FIG. 3B shows the operating waveforms of the zero-current switched quasi-resonant buck converter of FIG. 3A.

Any PWM circuit can be converted into a quasi-resonant circuit by replacing the PWM active switch with a quasi-resonant switch. For example, FIG. 3A shows a buck zero-current switched quasi-resonant converter with its operating waveforms shown in FIG. 3B. The arrangement of the waveforms in FIG. 3B is similar to the arrangement in FIG. 1B. It can be seen that in the zero-current switched converter, the current through the switch S is quasi-sinusoidal and reduces to zero before switch S is turned off. The turn-on of switch S, however, occurs with the input voltage $V_{IN}$ applied to the switch. This causes turn-on power dissipation. Maximum switching frequency of zero-current switched quasi-resonant converters is limited to about 2 MHz.

Figure 3C:
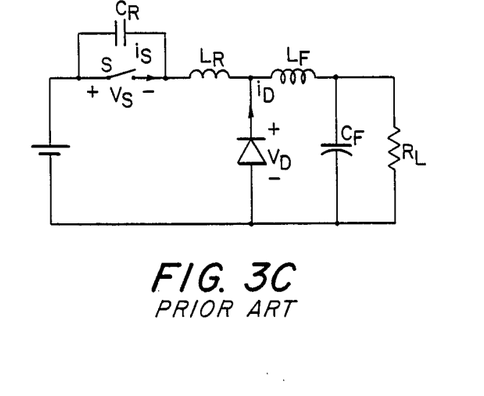
FIG. 3C is a schematic circuit diagram of a prior art zero-voltage quasi-resonant buck converter.
Figure 3D:
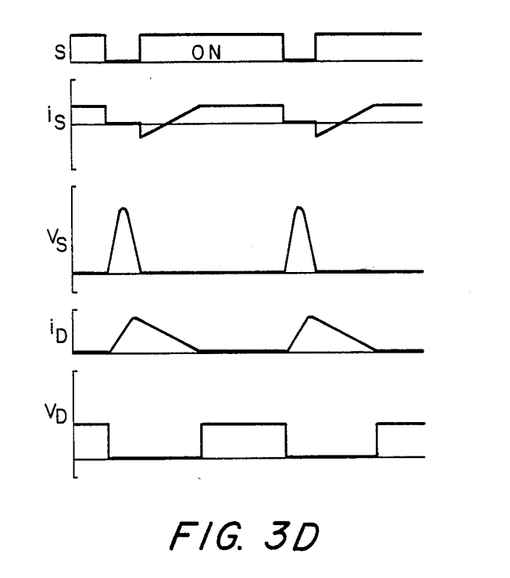
FIG. 3D shows the operating waveforms of the zero-voltage switched quasi-resonant buck converter of FIG. 3C.

It can be seen in FIGS. 3C and 3D, that in the zero-voltage switched quasi-resonant converter the voltage across the active switch is quasi-sinusoidal and reduced to zero prior to turn-on of the switch. This eliminates the turn-on losses. Zero-voltage switched quasi-resonant converters can operate at frequencies to about 10 to 20 MHz.

Zero-voltage switched quasi-resonant converters are capable of high operating frequencies. However, they have two major limitations. One problem is excessive voltage stress to the switching transistor. This voltage stress is proportional to the load range which makes it difficult to implement zero-voltage switched quasi-resonant converters in applications where load varies over a wide range of frequencies.

Another problem is caused by the parasitic junction capacitance of the rectifying diode D (see FIG. 3C). Theoretical zero-voltage switched quasi-resonant circuits do not include capacitance in parallel with the rectifying diode. The theoretical voltage across the diode is in the form of a quasi-square wave. In practice, the junction capacitance of the rectifier does not allow for such abrupt changes of the voltage. As a result, parasitic oscillations of the resonant inductance and rectifier's capacitance occur in the circuit. If damped, these oscillations cause power dissipation. If undamped, they adversely effect voltage gain of the converter which makes the converter difficult to control.

There is thus a need for a miniature DC/DC converter capable of operating at high frequency with reduction of voltage stress to the switching transistor, increase of the load range and reduction of the switching frequency. The present invention is directed toward filling that need.

SUMMARY OF THE INVENTION

The present invention relates to the use of a novel multi-resonant switch concept to generate families of zero-current switched and zero-voltage switched multi-resonant converters. The zero-voltage switched multi-resonant converters are particularly suitable for high-frequency on-board power supplies operating at high frequencies (10 MHz) and are superior to zero-voltage switched quasi-resonant converters since, by taking advantage of an additional resonance, the inventive converters achieve several advantageous features.

Figure 5A:
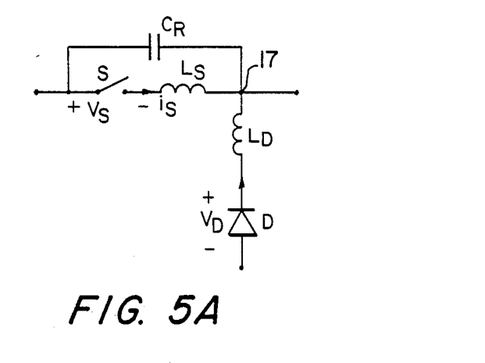
FIG. 5A is a schematic circuit diagram of a zero-current multi-resonant switch.
Figure 5B:
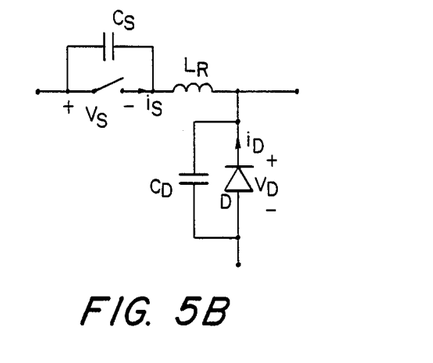
FIG. 5B is a schematic circuit diagram of a zero-voltage multi-resonant switch.

Most pulse width modulated (PWM) converters include active and passive switches that operate in pairs. When the active switch is closed, the passive switch is open and vice-versa. Such pairs can be extracted from a circuit and represented as a three-terminal, two-switch device. Multi-resonant switches consist of this three-terminal PWM device and three reactive components that form a resonant circuit. Zero-current multi-resonant switches contain two resonant inductors, $L_S$ and $L_D$ and a resonant capacitor, $C_R$. Zero-voltage switched multi-resonant switches, as shown in FIG. 5B, contain two resonant capacitors, $C_S$ and $C_D$ and a resonant inductor, $L_R$.

Multi-resonant converter circuits are generated by replacing the three-terminal PWM switches in a PWM circuit with a multi-resonant switch. For example, if the three-terminal PWM switch in a buck converter is replaced with a zero-current multi-resonant switch, a buck zero-current switched multi-resonant converter results. In a similar fashion, a buck zero-voltage switched multi-resonant converter is generated using a zero-voltage multi-resonant switch in a conventional buck converter.

It is thus a primary object of the present invention to provide a DC/DC converter employing multi-resonant switches.

It is still an object of the present invention to provide a multi-resonant converter that includes operation of both switching devices with quasi-sinusoidal voltage waveforms and zero-voltage transitions between on and off states.

It is another object of the invention to provide a multi-resonant converter exhibiting reduced transistor voltage stress.

It is a further object of the invention to provide a multi-resonant converter operating from no-load to full-load.

It is yet another object of the invention to provide a multi-resonant converter where most parasitic reactances (including output capacitance of the active switch, junction capacitance of the diode and leakage inductance of a transformer) can be included in the resonant circuit.

It is still an object of the invention to provide a multi-resonant converter possessing a reduced switching frequency range.

These and other objects and advantages will become apparent when the following drawings are viewed in connection with the detailed explanation to follow.

BRIEF DESCRIPTION OF THE DRAWINGS

FIGS. 10 A through 10F show six basic zero-current switched multi-resonant converters.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected and it is to be understood that each specific term includes all technical equivalents which operate in a similar manner to accomplish a similar purpose.

Figure 4:
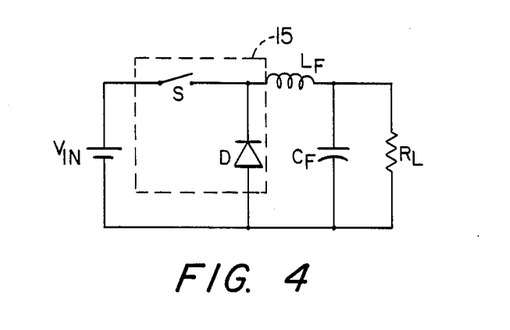
FIG. 4 is a schematic circuit diagram of a three-terminal PWM switch in a buck converter.

Most pulse width modulated (PWM) converters include active and passive switches that operate in pairs. The term "active switch" typically refers to a controlled transistor whereas "passive switch" typically refers to a diode. When the active switch is closed, the passive switch is open and vice-versa. Such pairs can be extracted from a circuit and represented as a three-terminal, two-switch device. For example, FIG. 4 shows a PWM buck converter with the three-terminal PWM switch 15 being outlined in phantom. Multi-resonant switches consist of this three-terminal PWM device 15 and three reactive components that form a resonant circuit. Zero-current multi-resonant switches, as shown in FIG. 5A, contain two resonant inductors, $L_S$ and $L_D$ and a resonant capacitor, $C_R$. An active switch S is in series with resonant inductor $L_S$. The switch S and inductor $L_S$ are in parallel with resonant capacitor $C_R$. The other resonant inductor $L_D$ is connected at one end to the node 17 formed by the connection of capacitor $C_R$ and inductor $L_S$. The other end of inductor $L_D$ is connected to the cathode of diode D.

Zero-voltage switched multi-resonant switches, as shown in FIG. 5B, contains two resonant capacitors, $C_S$ and $C_D$ and a resonant inductor, $L_R$. An active switch S is in series with resonant inductor $L_R$ and in parallel with resonant capacitor $C_S$. The cathode of diode D is connected to one end of inductor $L_R$. A second resonant capacitor $C_D$ is in parallel with diode D.

Figure 6A:
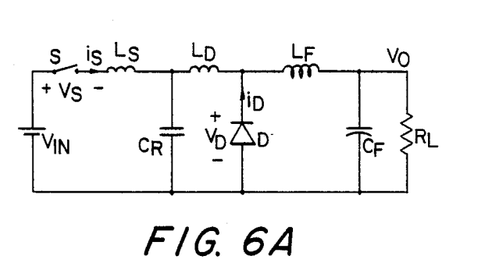
FIG. 6A is a schematic circuit diagram of a zero-current switched multi-resonant buck converter incorporating the teachings of the present invention.
Figure 6B:
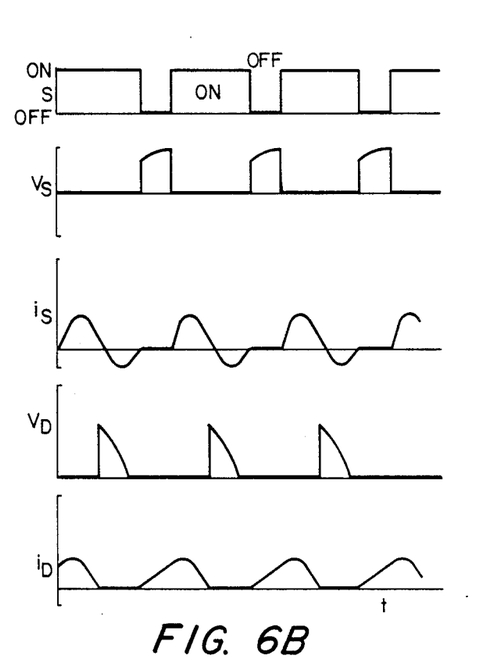
FIG. 6B shows the waveforms of the multi-resonant buck converter of FIG. 6A.

Multi-resonant converter circuits are generated by replacing the three-terminal PWM switches in a PWM circuit with a multi-resonant switch. For example, if the three-terminal PWM switch in FIG. 4A is replaced with the zero-current multi-resonant switch of FIG. 5A, a buck zero-current switched multi-resonant converter, as shown in FIG. 6A with its waveforms in FIG. 6B, is generated. The arrangement of the waveforms in FIG. 6B is similar to the arrangement in FIG. 1B. In a similar fashion, the buck zero-voltage switched multi-resonant converter, as shown in FIG. 6C with its waveforms in FIG. 6D, is generated using the multi-resonant switch of FIG. 5B.

Figure 6C:
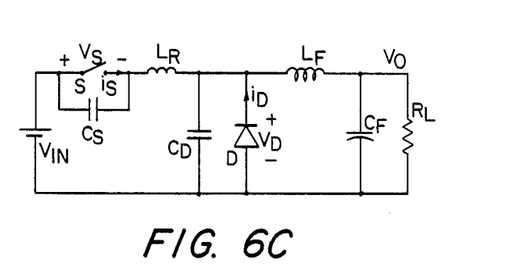
FIG. 6C is a schematic circuit diagram of a zero-voltage switched multi-resonant buck converter incorporating the teachings of the present invention.
Figure 6D:
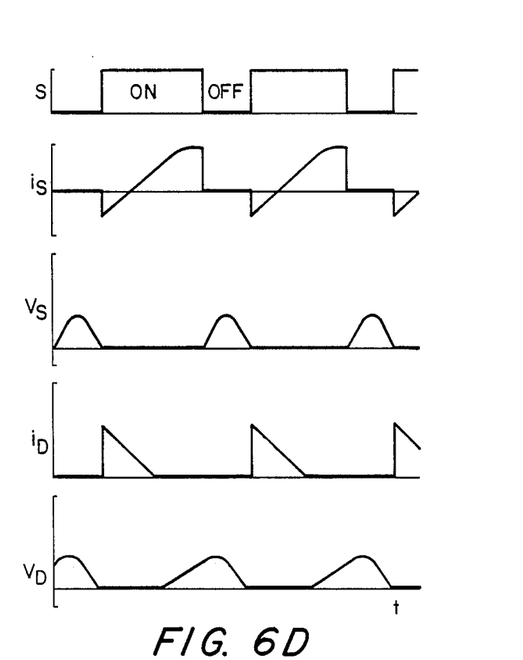
FIG. 6D shows the waveforms of the multi-resonant buck converter of FIG. 6C.

The buck zero-voltage switched multi-resonant converter of FIG. 6C basically comprises a voltage source $V_{IN}$ connected in series with a parallel arrangement of an active switch S and a capacitor $C_S$. This arrangement is, in turn, connected in series with an inductor $L_R$.

The series arrangement of the voltage source switch and inductor are in parallel with a capacitor $C_D$. In addition, a diode D is arranged in parallel with the capacitor $C_D$. The cathode of the diode is connected to one end of an inductor $L_F$ which together with a capacitor $C_F$ form a filter. A resistor $R_L$ is connected in parallel with the capacitor $C_F$ to form a load.

It can be seen in FIGS. 6A and 6B, that in a zero-current switched multi-resonant converter, current $i_S$ through the active switch S and current $i_D$ through the passive switch (diode D) are quasi-sinusoidal and reduce to zero at turn-off. Similarly, it can be seen in FIGS. 6C and 6D, that in the zero-voltage switched multi-resonant converter, voltage $V_S$ across the active switch S and voltage VD across the diode D are quasi-sinusoidal and have smooth transition between the on and off states.

Figure 7A:
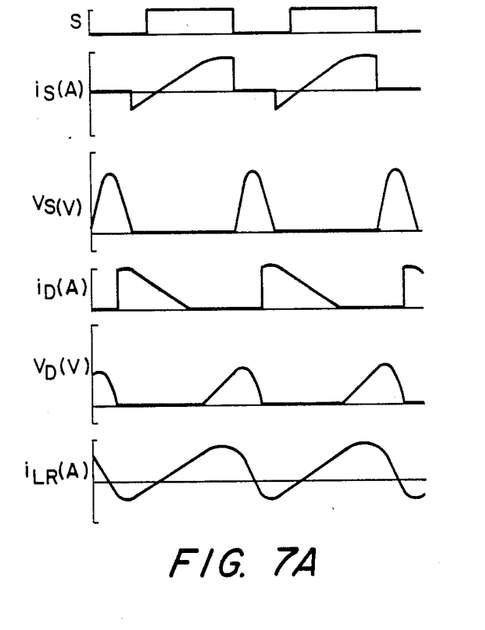
FIG. 7A shows the waveforms of the zero-voltage switched multi-resonant buck converter of FIG. 6C at an output power level of 25 W.
Figure 7B:
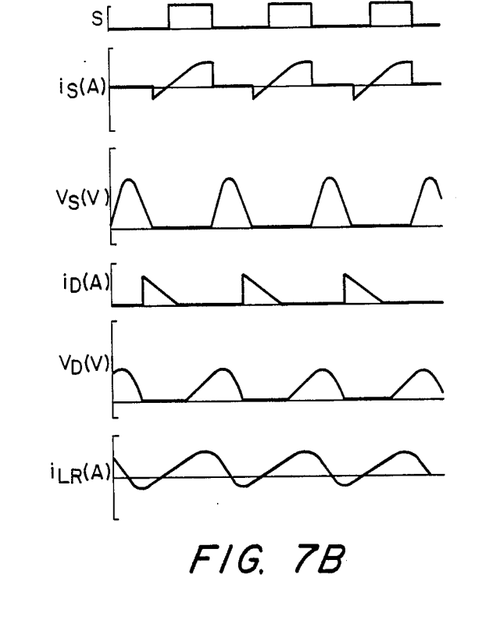
FIG. 7B shows the waveforms of the zero-voltage switched multi-resonant buck converter of FIG. 6C at an output power level of 10 W.
Figure 7C:
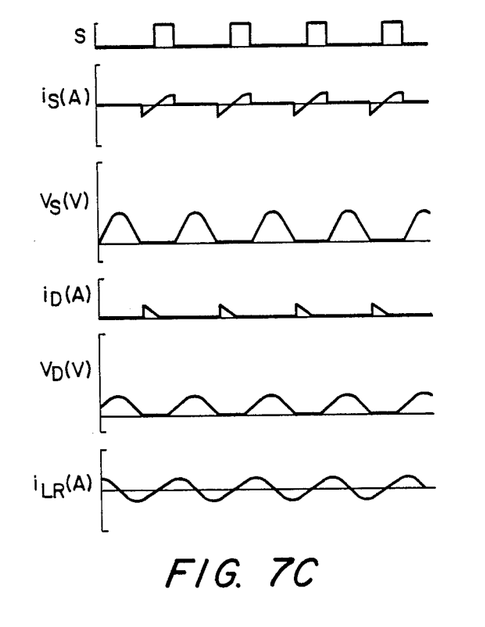
FIG. 7C the waveforms of the zero-voltage switched multi-resonant buck converter of FIG. 6C at an output power level of 2 W.
Figure 7D:
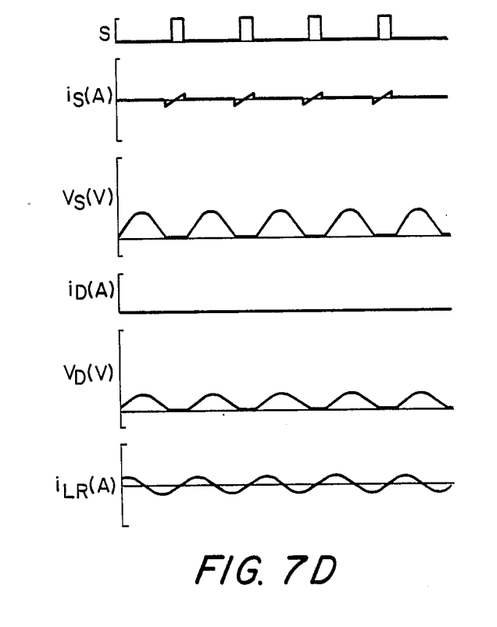
FIG. 7D shows the waveforms of the zero-voltage switched multi-resonant buck converter of FIG. 6C at an output power level of 0 W (no-load).

FIGS. 7A through 7D show waveforms for a buck zero-voltage switched multi-resonant converter at different levels of output power. In FIG. 7A the output power level is 25 W; in FIG. 7B the level is 10 W; in FIG. 7C the level is 2 W and in FIG. 7D the level is 0 (no-load). The multi-resonant converter used to generate the waveforms of FIGS. 7A through 7D is similar to that of FIG. 6C with $C_S=2.5$ nF, $C_D=5$ nF, $L_R=100$ nH, $V_{IN}=12$ V and $V_O=5$ V. It can be seen that no matter what the output power is, both switches have quasi-sinusoidal voltage waveforms and smooth transitions at turn-off and turn-on. This is a significant improvement over zero-voltage switched quasi-resonant converters since the latter lose the zero-voltage switching property at light loads.

Figure 8A:
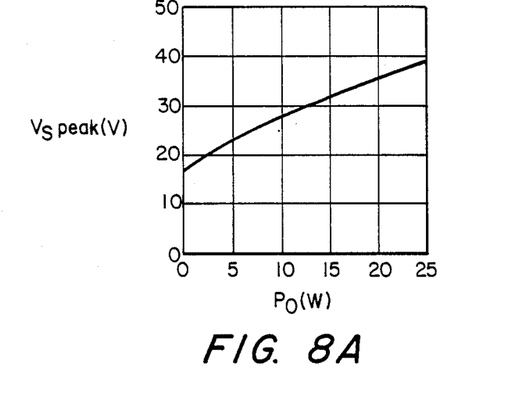
FIG. 8A is a graph that indicates voltage and current stresses in the buck zero-voltage switched multi-resonant converter as the function of output power at peak voltage across the active switch.

One of the important advantages of zero-voltage switched multi-resonant converters is reduction of voltage stress to the switching transistor. FIG. 8A shows transistor peak voltage as a function of output power for a buck zero-voltage switched multi-resonant converter. The maximum transistor voltage stress, $V_{smax}=38$ V, occurs at full-load and is only 3.17 times higher than the input voltage. As mentioned, in buck zero-voltage switched quasi-resonant converters, transistor voltage stress is proportional to the load range. For example, for a load range of 10:1, it would be 11 times the input voltage. It can be seen that zero-voltage switched multi-resonant converters offer substantial reduction of the transistor voltage stress and significant increase of the load range.

Figure 8B:
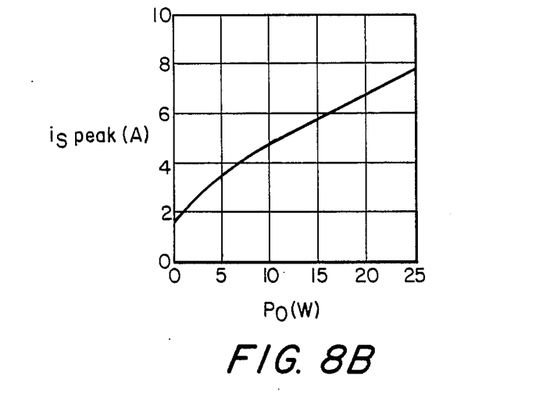
FIG. 8B is a graph that indicates voltage and current stresses in the buck zero-voltage switched multi-resonant converter as a function of output power at peak current of the active switch.

Due to additional resonance, transistor current stress in zero-voltage switched multi-resonant converters is higher than that in zero-voltage switched quasi-resonant converters. For example, transistor peak current as a function of output power is shown in FIG. 8B. The maximum transistor current stress, $I_{Smax}=7.6$ A$=1.52 I_o$, occurs at full-load and is 1.52 times higher than that found in buck zero-voltage switched quasi-resonant converters. Increased current stress may cause increased conduction losses in the transistor. However, due to reduction of the voltage stress, a low-voltage MOSFET with low on-resistance can be used and conduction losses can be reduced.

Figure 8C:
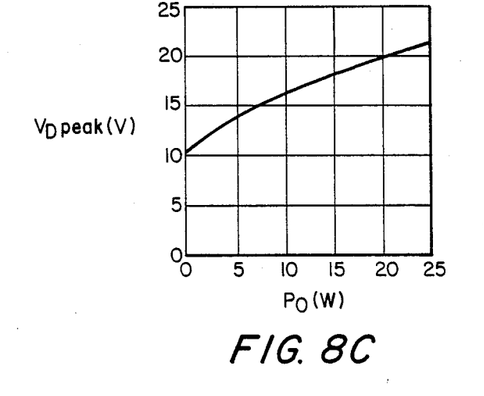
FIG. 8C is a graph that indicates voltage and current stresses in the buck zero-voltage switched multi-resonant converter as a function of output power at peak voltage across the diode.
Figure 8D:
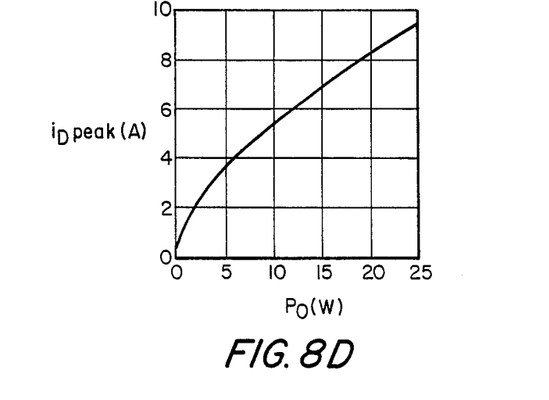
FIG. 8D is a graph that indicates voltage and current stresses in the buck zero-voltage switched multi-resonant converter as a function of output power at peak current of the diode.

Voltage and current stresses of the diode (passive switch) in the buck zero-voltage switched multi-resonant converter are plotted in FIGS. 8C and 8D as functions of the output power. The diode voltage stress is about 2 times the input voltage at full-load. In buck zero-voltage switched quasi-resonant converters, theoretical voltage stress of the diode is equal to the input voltage. However, in practical zero-voltage switched quasi-resonant converters, resonant inductance and diode junction capacitance resonate in an uncontrollable fashion, which may cause voltage stress of the diode similar or even higher than that in zero-voltage switched multi-resonant converters. Current stress of the diode is approximately two times higher than the output current. Thus, current stress in the diode is similar to the diode current stress in buck zero-voltage switched quasi-resonant converters.

In zero-voltage switched multi-resonant converters, the active switch operates with a constant off-time and variable on-time. On-time is adjusted to regulate output voltage. Therefore, just like zero-voltage switched quasi-resonant converters, zero-voltage switched multi-resonant converters are controlled by modulation of the switching frequency.

Zero-current switched multi-resonant converters operate with constant on-time. Regulation of the output is obtained by variation of the off-time.

Figure 9:
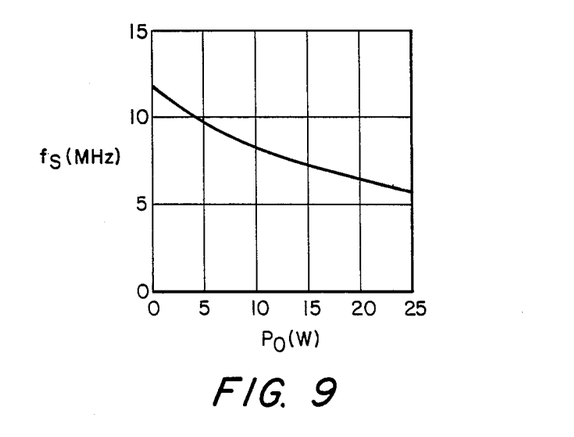
FIG. 9 is a graph that indicates the switching frequency versus the output power of the buck zero-voltage switched multi-resonant converter.

The relationship between output power and switching frequency in the buck zero-voltage switched multi-resonant converter of FIG. 6C is shown in FIG. 9 where $V_{IN}=12$ V and $V_O=5$ V. It can be seen that a frequency range of 2:1 provides regulation of the output voltage for the full-load range (0 to 25 W). For comparison, a buck zero-voltage switched quasi-resonant converter with load range 10:1 (2:5 to 25 W) requires a frequency range of 3:1. Therefore, zero-voltage switched multi-resonant converters achieve regulation with wider load range and narrower frequency bandwidth than those of zero-voltage switched quasi-resonant converters.

Comparison of various parameters of buck zero-voltage switched quasi-resonant converters and zero-voltage switched multi-resonant converters are given in Table I.

TABLE I

Comparison Of Parameters Of Buck Zero-Voltage Switched Quasi-Resonant Converters (ZVS-QRC) And Buck Zero-Voltage Switched Multi-Resonant Converters (ZVS-MRC)

| Parameter | | Buck ZVS-QRC | Buck ZVS-MRC |
|---|---|---|---|
| Load Range | $\frac{R_{Lmax}}{R_{Lmin}}$ | 10 | |
| Transistor Voltage Stress | $\frac{V_{Smax}}{V_{IN}}$ | 11 | 3.17 |
| Transistor Current Stress | $\frac{I_{Smax}}{I_o}$ | 1 | 1.52 |
| Diode Voltage Stress | $\frac{V_{Dmax}}{V_{IN}}$ | 1* | 2.0 |
| Diode Current Stress | $\frac{I_{Dmax}}{I_o}$ | 2 | 1.9 |
| Frequency Range | $\frac{f_{Smax}}{f_{Smin}}$ | 3 | 2.0 |

*This stress can be higher.

It can be seen that zero-voltage switched multi-resonant technology is a substantial improvement over zero-voltage switched quasi-resonant technology.

Figure 10A:
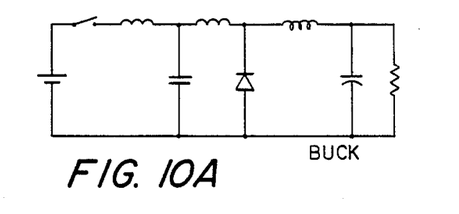
Figure 10B:
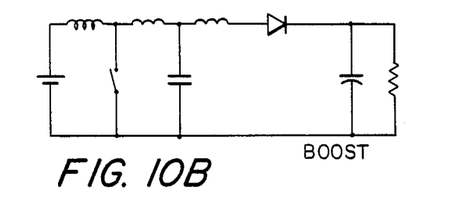
Figure 10C:
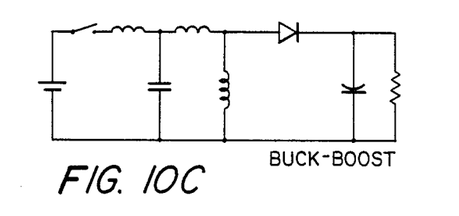
Figure 10D:
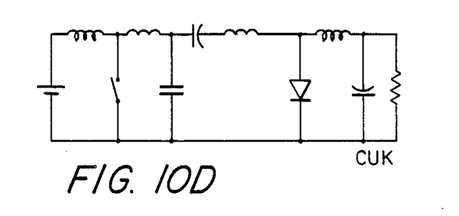
Figure 10E:
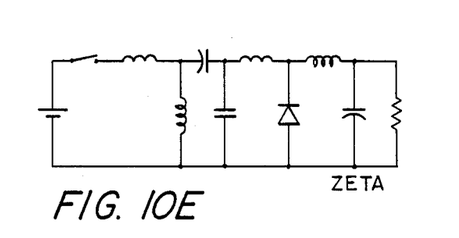
Figure 10F:
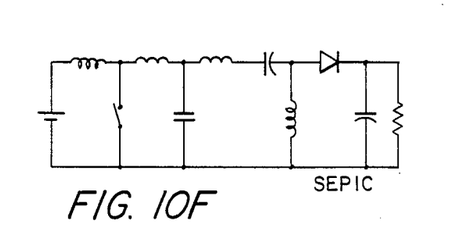
Figure 11A:
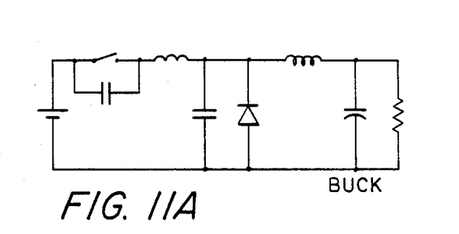
FIGS. 11A through 11F show six basic zero-voltage switched multi-resonant converters.
Figure 11B:
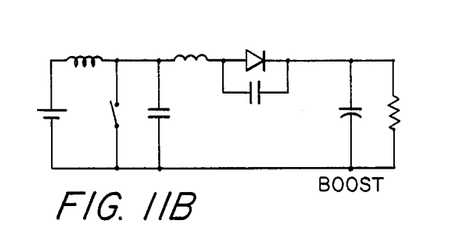
Figure 11C:
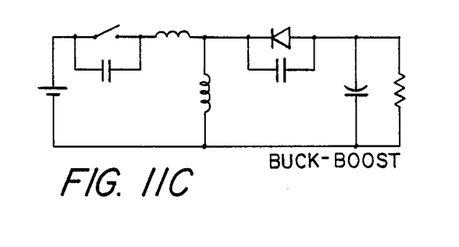
Figure 11D:
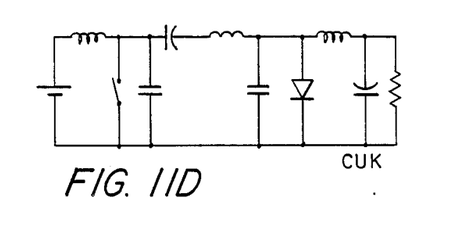
Figure 11E:
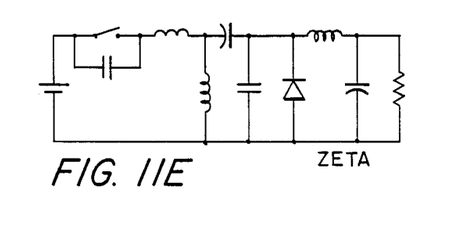
Figure 11F:
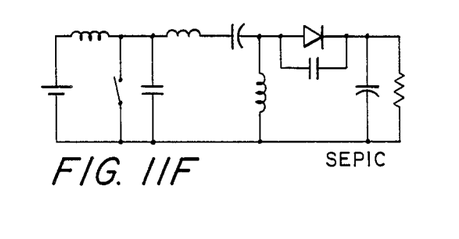
Figure 12A:
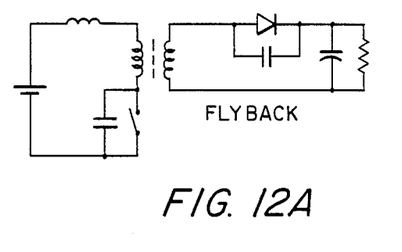
FIGS. 12A through 12D show isolated zero-voltage switched multi-resonant converters employing transformers.
Figure 12B:
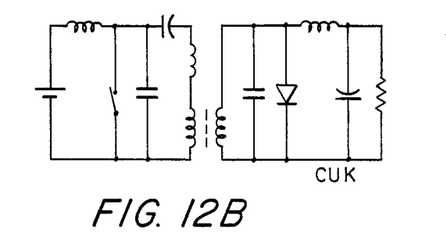
Figure 12C:
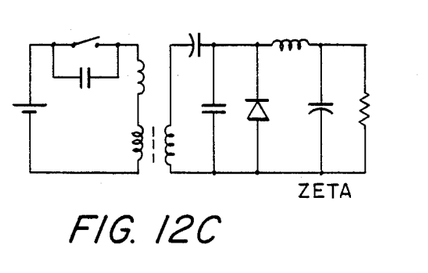
Figure 12D:
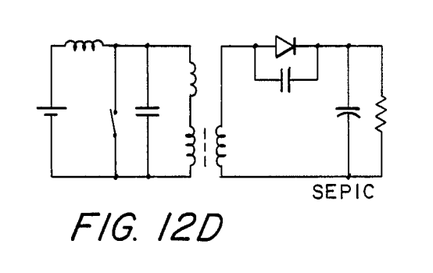
Figure 13A:
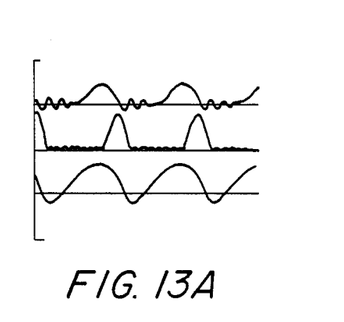
FIG. 13A shows a waveform of the buck zero-voltage switched multi-resonant converter at an output power level at 25 W.
Figure 13B:
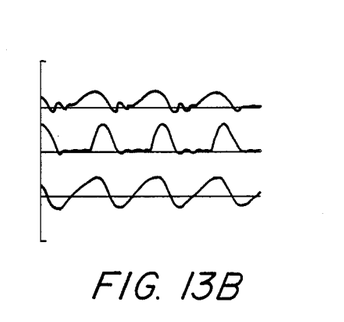
FIG. 13B shows a waveform of the buck zero-voltage switched multi-resonant converter at an output power level at 10 W.
Figure 13C:
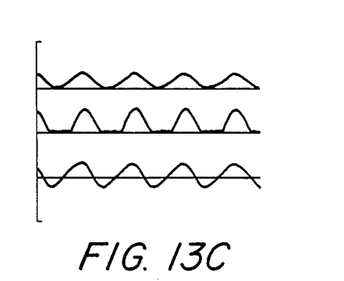
FIG. 13C shows an experimental waveform of buck zero-voltage switched multi-resonant converter at an output power level at 2 W.
Figure 13D:
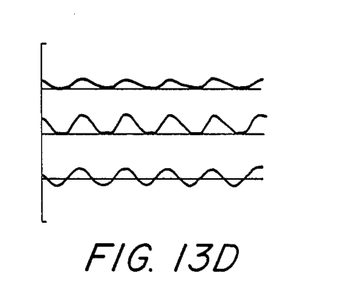
FIG. 13D shows a waveform of the buck zero-voltage switched multi-resonant converter at an output power level at 0 W (no-load).

Using the multi-resonant switches of FIGS. 5A and 5B, it is possible to generate many multi-resonant converter circuits. Six basic zero-current switched multi-resonant topologies are shown in FIGS. 10A through 10F. FIG. 10A shows the zero-current switched multi-resonant circuit incorporated into a buck converter. FIG. 10B shows the same for a boost converter; FIG. 10C for a buck-boost converter; FIG. 10D for a cuk converter; FIG. 10E for a zeta converter; and FIG. 10F for a sepic converter. Similarly, six basic zero-voltage switched multi-resonant circuits are shown in FIGS. 11A through 11F. An isolated converter circuit is obtained by inserting a transformer into a basic converter topology. For example, FIGS. 12A through 12D show four isolated zero-voltage switched multi-resonant converters. FIG. 12A shows a flyback converter; FIG. 12B for a cuk converter; FIG. 12C for a zeta converter and FIG. 12D for a sepic converter.

A specific embodiment of a circuit in the form of buck zero-voltage switched multi-resonant converter of the type shown in FIG. 6C. Diode voltage, transistor voltage and resonant inductor current waveforms of the converter of FIG. 6C at different output power levels are shown in FIGS. 13A through 13D. In each illustration, the time scale along the bottom is 50 ns/division. The top trace, $V_D$, has a scale of 20 V/div. The middle trace, $V_S$, has a scale of 20 V/div. The bottom trace, $i_{LR}$, has a scale of 5 A/div. It can be seen that both the transistor and the diode have quasi-sinusoidal voltage waveforms and smooth transitions between the on and off states for the full-load range. Measured values of output power, switching frequency, efficiency and voltage stresses are given in Table II.

TABLE II

Measured Parameters Of Buck Zero-Voltage Switched Multi-Resonant Converters

| $P_O$ [W] | f [MHz] | η [%] | $V_{Smax}$ [V] | $V_{Dmax}$ [V] |
|---|---|---|---|---|
| 25 | 5.45 | 73 | 32 | 18 |
| 10 | 7.70 | 74 | 25 | 14 |

TABLE II-continued

Measured Parameters Of Buck Zero-Voltage Switched Multi-Resonant Converters

| $P_O$ [W] | f [MHz] | n [%] | $V_{Smax}$ [V] | $V_{Dmax}$ [V] |
|---|---|---|---|---|
| 2 | 8.99 | 56 | 21 | 12 |
| 0 | 9.93 | 0 | 16 | 8 |

Figure 14A:
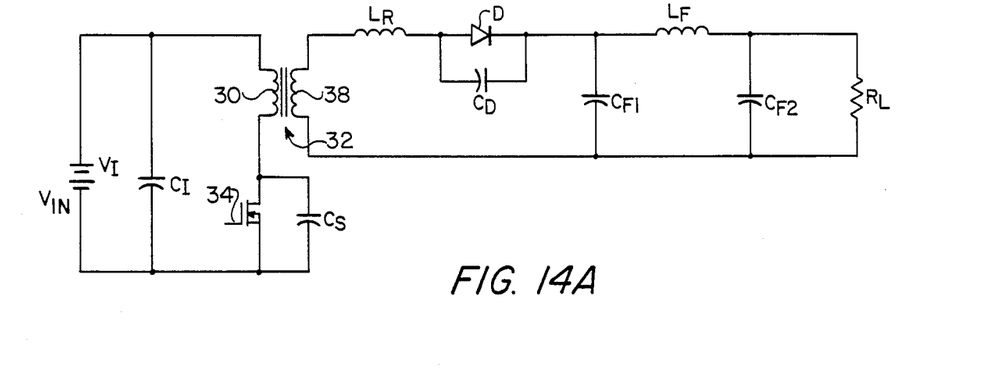
FIG. 14A is a schematic circuit diagram of a flyback zero-voltage switched multi-resonant converter.
Figure 14B:
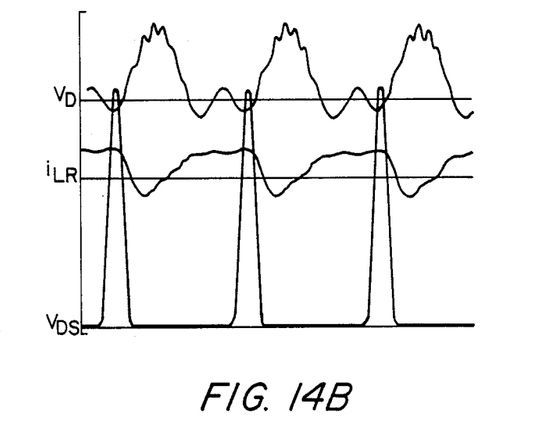
FIG. 14B is a waveform of the flyback zero-voltage switched multi-resonant converter of FIG. 14A.
Figure 14C:
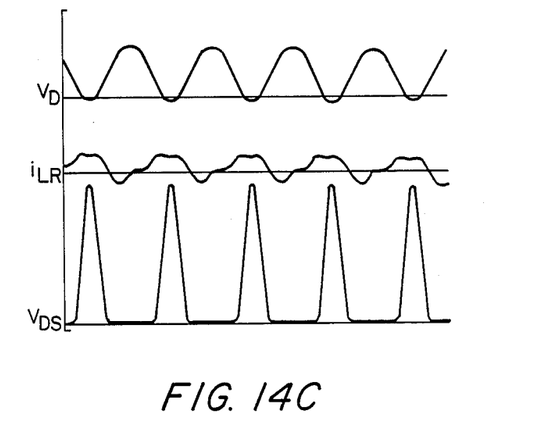

Circuit diagrams and waveforms of a flyback zero-voltage switched multi-resonant converter are shown in FIGS. 14A through 14C.

The flyback zero-voltage switched multi-resonant converter of FIG. 14A basically comprises a voltage source $V_I$ in parallel with a capacitor $C_I$. $C_I$ represents the input winding 30 of transformer 32 is in series with an MOSFET 34. The series arrangement of the primary winding and the field effect transistor are in parallel with the voltage source $V_I$. In a preferred embodiment, the MOSFET is manufactured by International Rectifier Corporation and bears the product designation IRF 530. A capacitor $C_S$ is in parallel with the drain and source of the field effect transistor 34. The gate of the transistor is operated by a drive not forming part of the subject invention.

The secondary winding 38 of transformer 32 is connected in series with a resonant inductance $L_R$ which, in turn, is connected to a parallel arrangement of a diode D and a capacitor $C_D$. The anode of the diode is connected to one end of the inductor $L_R$. The cathode of the inductor is connected to a capacitor $C_{F1}$ which has the other end connected to the secondary winding 38. The cathode of the diode is also connected to an inductor $L_F$ which together with capacitors $C_{F1}$ and $C_{F2}$ form a filter. A resistor $R_L$ which represents a load is placed in parallel with capacitor $C_{F2}$.

The circuit operates with an input voltage range of from about 30 V to about 40 V and a load resistance range of from about 2Ω to infinity (no-load). With the regulated output voltage at 5 V, switching frequency was varied from 5.21 MHz ($V_{IN}$=30 V, $R_L$=2Ω) to 9.31 MHZ ($V_{IN}$=40 V, no-load). Maximum voltage stress to the active switch was about 300 V.

Figure 15:
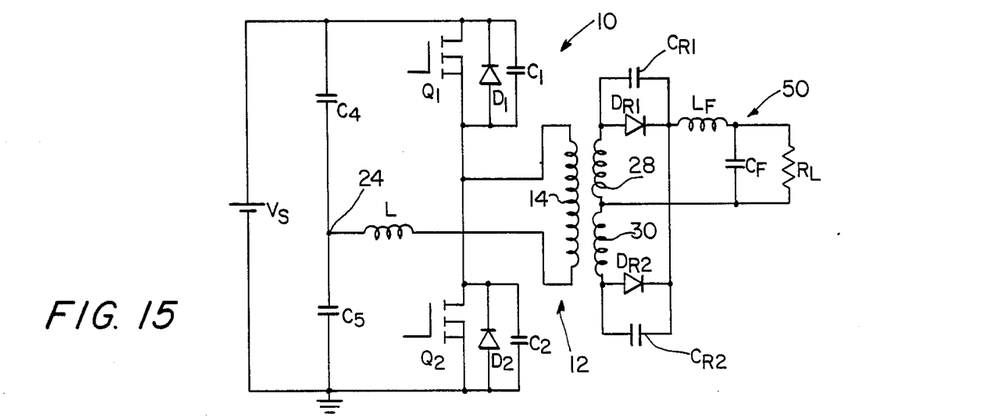
FIG. 15 is a schematic circuit diagram of a half-bridge zero-voltage switched multi-resonant converter.

FIG. 15 shows a half-bridge zero-voltage switched multi-resonant converter 10 embodying the teachings of the present invention. In a preferred embodiment, a voltage source $V_S$ is connected in parallel with capacitors $C_4$ and $C_5$ which represent the input capacitance and are arranged in series. The voltage supply is also connected in parallel with two switching assemblies 20 and 22 which, in turn, are connected in series. Top switching assembly 20 consists of a transistor $Q_1$ in parallel with a diode $D_1$ and capacitor $C_1$. Bottom switch 22 consists of a transistor $Q_2$ in parallel with a diode $D_2$ and a capacitor $C_2$. In a preferred embodiment, each of the transistor switches $Q_1$ and $Q_2$ are made up of a metal oxide semiconductor field effect transistor (MOSFET).

Capacitors $C_4$ and $C_5$ share a common connection at node 24. In turn, transistors $Q_1$ and $Q_2$ share a common connection at node 26. The primary winding 14 of a transformer 12 is connected across nodes 24 and 26. The transformer contains two secondary windings 28 and 30. Secondary winding 28 is connected in series with a diode $D_{R1}$, an inductor $L_F$ and the parallel arrangement of capacitor $C_F$ and resistor $R_L$. The secondary winding has one end connected to the anode of the diode $D_{R2}$ which, in turn, has its cathode connected to the anode of diode $D_{R1}$.

Resonant capacitors $C_1$ and $C_2$ represent the internal output capacitance of the MOSFET switches $Q_1$ and $Q_2$, whereas diodes $D_1$ and $D_2$ represent the body diodes of the switches. L is the total inductance of the primary winding 14 of transformer 12. Resonant capacitor $C_{R1}$ is in parallel with rectifying diode $D_{R1}$, whereas resonant capacitor $C_{R2}$ is in parallel with rectifying diode $D_{R2}$. For a more detailed analysis of the half-bridge converter see co-pending U.S. patent application Ser. No. 07/099,952 filed on Sept. 23, 1987 to Jovanovic et al and titled OFF-LINE ZERO-VOLTAGE SWITCHED QUASI-RESONANT CONVERTER.

From the above, it is apparent that many modifications and variations of the present invention are possible in light of the above teachings. It is therefore to be understood that, within the scope of the appended claims, the invention may be practiced otherwise than as specifically described.

What is claimed is:

1. A multi-resonant converter for converting a DC input signal from a supply to a DC output signal to be imposed across a load, said device comprising:
   an input stage for receiving the DC input signal;
   an output stage for imposing said DC output signal across the load;
   an active switch and a passive switch interposed between said input and output stages; and
   reactive means for causing said active and passive switches to act together as a multi-resonant switch.

2. The converter of claim 1, wherein said reactive means comprises a first capacitor in parallel with said passive switch, an inductor in series with said active switch and a second capacitor in parallel with said active switch.

3. The converter of claim 1, wherein said reactive means comprises a first inductor in series with said active switch, a capacitor in parallel with said serially arranged active switch and first inductor, and a second inductor in series with said passive switch.

4. A multi-resonant converter for converting a Dc input signal from a supply to a DC output signal to be imposed across a load, said device comprising:
   input stage for receiving the DC input signal;
   an output stage for imposing said DC output signal across the load; and
   a zero-voltage switched multi-resonant switch operatively connected between said input and output stages for switching the voltage passing through said multi-resonant switch, said voltage being quasi-sinusoidal and exhibiting smooth transition between the on and off states of said multi-resonant switch.

5. The converter of claim 4, wherein said zero-voltage switched multi-resonant switch comprises:
   an active switch means for receiving said input signal from said input stage;
   a passive switch means operatively connected across said output stage;
   a resonant inductor in series with said active switch means;
   a first resonant capacitor in parallel with said active switch means; and
   a second resonant capacitor in parallel with said passive switch means.

6. The converter of claim 5, wherein said active switch means comprises a metal oxide semiconductor field effect transistor.

7. The device of claim 5, wherein said passive switch means is a diode.

8. A multi-resonant converter for converting a DC input signal from a supply to a DC output signal to be imposed across a load, said device comprising:
   an input stage for receiving the DC input signal;
   an output stage for imposing said DC output signal across the load; and
   a zero-current switched multi-resonant switch operatively connected between said input and output stages for switching the current passing through said multi-resonant switch to be quasi-sinusoidal and reduced to zero at the turn-off of said multi-resonant switch.

9. The converter of claim 8, wherein said zero-voltage switched multi-resonant switch comprises:
   an active switch means for receiving said input signal from said input stage;
   a passive switch means operatively connected across said output stage;
   a first resonant inductor in series with said active switch means;
   a resonant capacitor in parallel with said serially arranged active switch means and first resonant inductor; and
   a second resonant inductor in series with said passive switch means.

10. The converter of claim 9, wherein said active switch means comprises a metal oxide semiconductor field effect transistor.

11. The converter of claim 9, wherein said passive switch means is a diode.

* * * * *